United States Patent [19]

Hieda

[11] Patent Number: 5,307,159
[45] Date of Patent: Apr. 26, 1994

[54] COLOR IMAGE SENSING SYSTEM
[75] Inventor: Teruo Hieda, Kanagawa, Japan
[73] Assignee: Canon Kabushiki Kaisha, Tokyo, Japan
[21] Appl. No.: 108,183
[22] Filed: Aug. 17, 1993

Related U.S. Application Data

[63] Continuation of Ser. No. 584,360, Sep. 18, 1990, abandoned.

[30] Foreign Application Priority Data

Sep. 28, 1989 [JP] Japan .................. 01-250690

[51] Int. Cl.⁵ .................. H04N 9/07; H04N 9/04
[52] U.S. Cl. .................. 348/235; 348/273; 348/281
[58] Field of Search .................. 358/44, 41, 43, 42, 358/45, 47, 48, 40, 55; H04N 9/07, 9/04, 9/77

[56] References Cited

U.S. PATENT DOCUMENTS

| | | | |
|---|---|---|---|
| 4,131,913 | 12/1978 | Yamanaka et al. | 358/43 |
| 4,450,475 | 5/1984 | Ishikawa et al. | 358/44 |
| 4,467,347 | 8/1984 | Ozawa et al. | 358/44 |

FOREIGN PATENT DOCUMENTS

| | | | |
|---|---|---|---|
| 0104390 | 5/1987 | Japan | H04N 9/70 |
| 0268285 | 10/1989 | Japan | H04N 9/70 |

Primary Examiner—Mark R. Powell
Assistant Examiner—Michael H. Lee
Attorney, Agent, or Firm—Robin, Blecker, Daley & Driscoll

[57] ABSTRACT

In a color image sensing system, a solid state image sensor has every four adjacent picture elements thereof grouped as one set, and combinations of color filters are arranged to cover almost all the picture elements of the image sensor. The color filters include first color filters which are arranged to pass a given color component for an obliquely adjacent pair of picture elements within each of the sets, and second and third color filters which are arranged to cover the other obliquely adjacent pair of picture elements within the same set. A signal composing circuit is arranged to receive the outputs of the solid-state image sensor, to form a signal corresponding to one of the picture elements having the first color filters by combining, in a given ratio, the output of this picture element and also those of other picture elements having the first color filters, and to form a signal corresponding to one of the picture elements having the second or third color filters by combining, in a given ratio, the outputs of the picture elements which have the first color filters and are disposed in the neighborhood of that picture element above, below and on the left and right sides of that picture element.

36 Claims, 3 Drawing Sheets

COLOR IMAGE SENSING SYSTEM

This is a continuation application under 37 CFR 1.62 of prior U.S. patent application Ser. No. 584,360, filed Sep. 18, 1990, now abandoned.

BACKGROUND OF THE INVENTION

1. Field of the Invention

This invention relates to a color image sensing system of the kind using a solid-state image sensor.

2. Description of the Related Art

Many of the image sensing systems of the kind using a solid-state image sensor such as a CCD, MOS or the like have been formed with a color mosaic filter, etc., arranged in front of a single image sensor.

For example, they are arranged as follows: Among the picture elements of the image sensor, every four mutually adjacent picture elements are grouped as one set. For each of these sets, green (G) filters are allotted to two obliquely adjacent ones of the picture elements, a red (R) filter to one of the rest and a blue (B) filter to the other (a G-check, R and B method). This filter allotment is repeated for all the picture elements of the image sensor. With the picture elements arranged in this manner, a luminance signal Y and color-difference signals R-Y and B-Y are composed from the outputs of the image sensor and formed into a color video signal.

In another known method, the filter colors to be allotted to each of the groups (sets) of four picture elements of the image sensor are arranged to be white (W), green (G), yellow (Ye) and cyan (Cy) or to be magenta (Mg), green (G), yellow (Ye) and cyan (Cy).

In forming, for example, a luminance signal in accordance with the above-stated conventional method, however, spurious resolution tends to be caused by the color of a picture-taking object or by the ratio of color components of illumination light because the signal is composed of the outputs of the picture elements corresponding to a plurality of color filters. Under such a condition, it is hardly possible to obtain an adequate resolution.

In the case of the above-stated G-check, R and B method, for example, no luminance output is obtainable from the picture elements corresponding to the G and B filters in taking a picture of a red object. Then, in the horizontal direction of the image sensor, the luminance output is obtainable only from one of every two picture elements. This is equivalent to a decrease in the sampling frequency and thus increases the possibility of spurious resolution. Other methods mentioned above also present the same problem.

SUMMARY OF THE INVENTION

This invention is directed to the solution of the above-stated problem of the prior art. It is, therefore, an object of the invention to provide a color image sensing system which is capable of giving a color video signal without any excessive spurious resolution.

To attain the above-stated object, a color image sensing system arranged according to this invention as an embodiment thereof comprises: a solid-state image sensor arranged to group every mutually adjacent four picture elements as one set among the picture elements of the image sensor, to be provided with a combination of color filters including first color filters which pass a given color component for an obliquely adjacent pair of picture elements of each of the sets and second and third color filters which are arranged for the remaining two picture elements of the same set respectively, the color filter combination being arranged to cover almost all the picture elements of said image sensor; and luminance signal composing means arranged to receive an output of the solid-state image sensor, to form a signal which corresponds to one of the picture elements having the first color filters by combining in a given ratio an output of this picture element with outputs of other picture elements having the first color filters and disposed obliquely adjacent to this picture element and to form a signal which corresponds to one of the picture elements having the second or third color filters by combining in a given ratio outputs of picture elements having the first color filters and disposed in the neighborhood of that picture element in the lateral and vertical directions. With the embodiment arranged in this manner, a luminance signal which corresponds to each of the picture elements is composed of solely the outputs of the picture elements covered by the first color filters.

The above and other objects and features of the invention will become apparent from the following detailed description of an embodiment thereof taken in connection with the accompanying drawings.

BRIEF DESCRIPTION OF THE DRAWINGS

FIGS. 2(a) to 2(e) are diagrams for explaining the operation of the embodiment.

DETAILED DESCRIPTION OF THE PREFERRED EMBODIMENT

Figure 1:
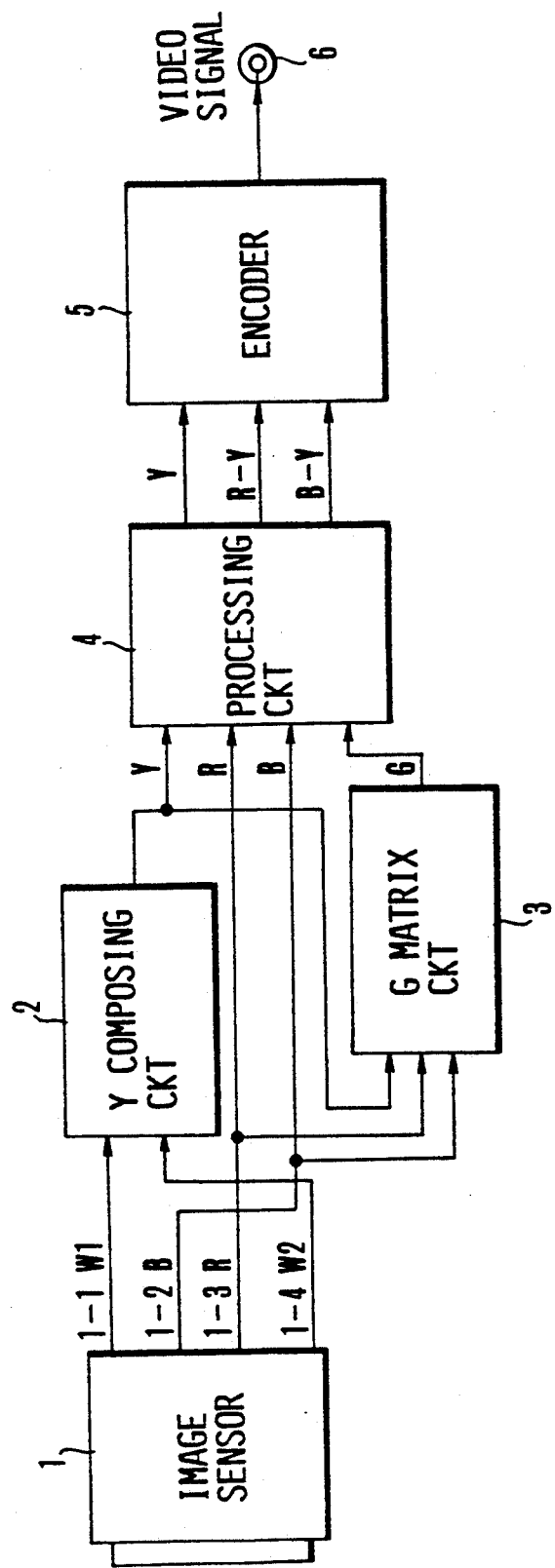
FIG. 1 is a block diagram showing an embodiment of this invention.

FIG. 1 shows in a block diagram a color image sensing system which is arranged according to this invention as an embodiment thereof.

Figures 2A, 2B, 2C, 2D, 2E:
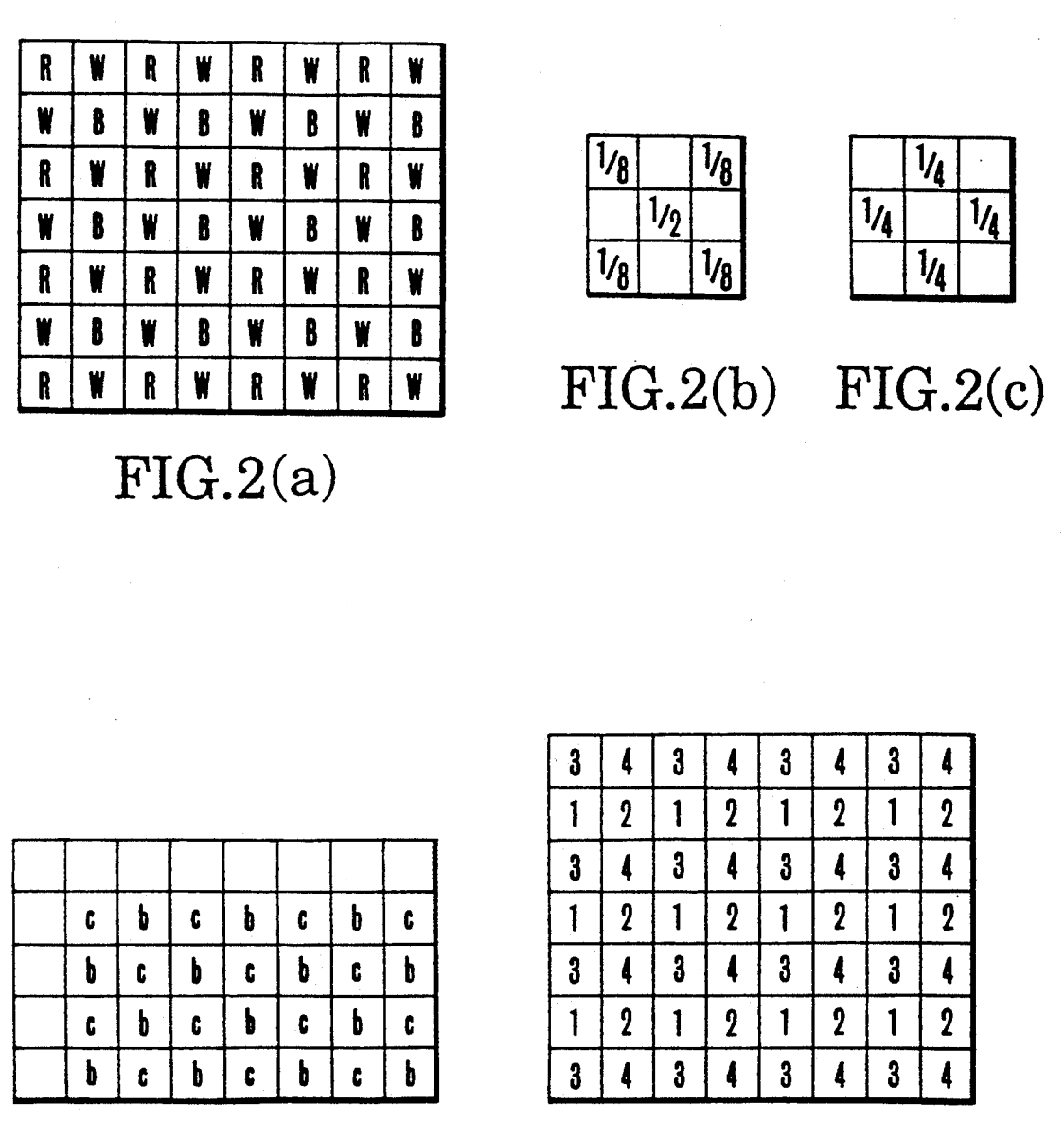

Referring to FIG. 1, photo-electric conversion elements (hereinafter referred to as picture elements) are two dimensionally arranged. Every four mutually adjacent picture elements are grouped as one set. A color mosaic filter consists of, as shown in FIG. 2(a), filters W which allow all the color components (predetermined color components) of light to pass, filters which are for red (R) and filters which are for blue (B). The color mosaic filter is arranged to allot the filters W to one of the two obliquely adjacent pairs of picture elements included in each of the above-stated sets of four picture elements, to allot the filter R to one of the other obliquely adjacent pair of picture elements and to allot the filter B to the other of the pair. The solid-state image sensor is arranged to permit the outputs of the four picture elements to be simultaneously read out from four output lines. Further, this color mosaic filter is repeatedly arranged to cover almost all the picture elements except black reference picture elements and dummy picture elements. A luminance signal composing circuit 2 is arranged to form a luminance signal Y from the two W outputs which are included in the four outputs of the solid-state image sensor 1. A G matrix circuit 3 is arranged to form a green signal G from the outputs R and B of the solid-state image sensor 1 and the output of the luminance signal composing circuit 2. A processing circuit 4 is arranged to perform gamma correction, white clipping, black clipping, color difference matrix processes, etc.. An encoder 5 is arranged to perform balanced modulation and synchronizing (sync) signal adding processes. An output terminal 6 is arranged to output a video signal. An object image which is not shown is formed on the photo-electric conversion plane of the solid-state image sensor 1 through a lens which is not shown and the color mosaic filter which is arranged as shown in FIG. 2(a). Then, electrical signals W1, B, R and W2 are output from the terminals 1-1, 1-2, 1-3 and 1-4 of the image sensor 1.

FIG. 2(e) shows the output lines of the solid-state image sensor from which the output of the picture elements are obtained. In FIG. 2(e), a reference numeral 1 denotes the outputs of the picture elements to be obtained from the output terminal 1-1 of the solid-state image sensor 1. Numerals 2, 3 and 4 likewise denote the outputs of the picture elements to be obtained from the output terminals 1-2, 1-3 and 1-4 of the image sensor.

Of these outputs, the signals W1 and W2 are converted into a luminance signal Y by the luminance signal composing circuit 2. The signals R and B and the output Y of the luminance signal composing circuit 2 are supplied to the G matrix circuit 3 to be converted into a green signal G. These signals Y, R, G and B are supplied to the processing circuit 4 to be subjected to various processes including the gamma correction, etc. As a result of these processes, a luminance signal Y2 and color-difference signals R-Y and B-Y are formed. These signals Y2, R-Y and B-Y are supplied to the encoder 5 to be converted into a video signal by the encoder 5. The video signal thus formed is output from the video output terminal 6.

FIGS. 2(a) to 2(e) are diagrams for explaining the operation of the luminance signal composing circuit 2 of FIG. 1. Of these drawings, FIG. 2(a) shows the color allocation of the color mosaic filter on the solid-state image sensor 1. As mentioned in the foregoing, four picture elements are grouped as one set. For each of these four-picture-element sets, the filters W are allotted to two of the picture elements which are obliquely adjacent to each other. The red filter R is allocated to one of the remaining two picture elements and the blue filter B to the other of the remaining two picture elements. FIG. 2(b) shows a matrix for composing the luminance signal. FIG. 2(c) shows another matrix for composing the luminance signal Referring to FIGS. 2(b) and 2(c), each of these $3 \times 3$ matrixes is arranged to form an output corresponding to the central picture element by interpolating four or five picture elements FIG. 2(d) shows how the matrixes of FIGS. 2(b) and 2(c) are allotted to each picture element In other words, a reference symbol "b" denotes that the matrix of FIG. 2(b) is used in composing the luminance signal for a picture element "b" by using a total of five picture elements including this picture element "b" and obliquely adjacent picture elements which are disposed above and below this picture element "b" in accordance with the matrix of FIG. 2(b). A reference symbol "c" denotes that the matrix of FIG. 2(c) is used in composing the luminance signal of a picture element "c" by using a total of four picture elements which are disposed on the right and left sides of and above and below that picture element "c" according to the matrix of FIG. 2(c).

Figure 3:
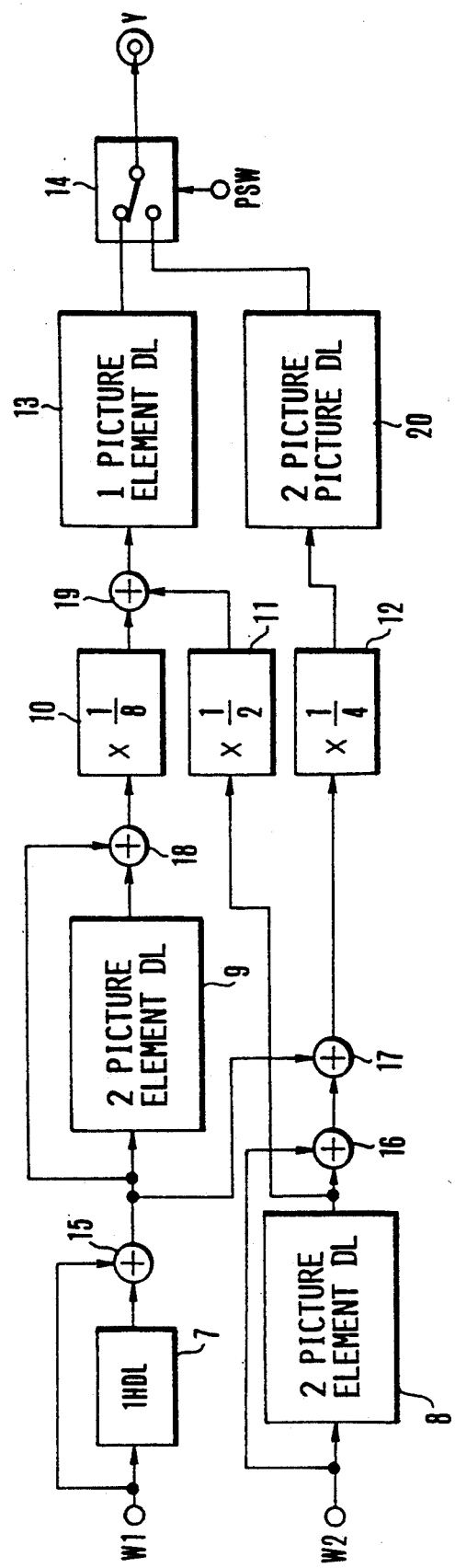
FIG. 3 is a block diagram showing the arrangement of a luminance signal composing circuit 2.

FIG. 3 shows by way of example the arrangement of the luminance signal composing circuit 2 of FIG. 1. Referring to FIG. 3, a one-H delay line 7 is arranged to delay the input signal for one horizontal period of the TV signal. Two-picture-element delay lines 8, 9 and 20 are arranged to delay the input signal for a period of time corresponding to two picture elements. Reference numerals 10, 11 and 12 denote coefficient circuits respectively. A numeral 13 denotes one-picture-element delay line which is arranged to delay the input signal for a period of time corresponding to one picture element. A numeral 14 denotes a switch circuit. Numerals 15 to 19 denote adders respectively.

The input signal W1 is delayed by the one-H delay line 7. The input signal W1 is supplied also to the adder 15 without being delayed. The adder 15 adds together the delayed signal W1 and the non-delayed signal W1. The output of the adder 15 is supplied to the two-picture-element delay line 9 and to the adder 18. The output of the adder 15 is thus delayed by the delay line 9 and the delayed signal is added to the non-delayed signal by the adder 18. The coefficient circuit 10 then multiplies the output of the adder 18 by $\frac{1}{4}$. Meanwhile, the input signal W2 is delayed for a period of time corresponding to two picture elements by the two-picture-element delay line 8, and then the coefficient circuit 11 multiplies the output of the delay line 8 by $\frac{1}{2}$. The outputs of the coefficient circuits 10 and 11 are added together by the adder 19. As a result, the signal "b" which is shown in FIG. 2(b) is obtained. Further, the output of the adder 15 is supplied also to the adder 17. Meanwhile, the adder 16 adds together the non-delayed signal W2 and the signal W2 which is delayed by the two-picture-element delay line 8. The adder 17 adds together the output of the adder 15 and that of the adder 16. The coefficient circuit 12 then multiplies the output of the adder 17 by $\frac{1}{4}$. The output of the coefficient circuit 12 is delayed by the two-picture-element delay line 20. As a result, the signal "c" which is shown in FIG. 2(c) is output from the delay line 20. The signal "b" is supplied to the one-picture element delay line 13 to be delayed for a period of time corresponding to one picture element. The delayed signal "b" is supplied to the switch circuit 14. The signal "b" or "c" is then output as the luminance signal Y through a switch-over action performed on the signals "b" and "c" by the switch circuit 14.

In the case of this embodiment, the luminance signal for each of the picture elements of the solid-state image sensor 1 is thus composed of only the outputs of the picture elements that are covered with the first color filters which pass all colors. The possibility of the spurious resolution can be reduced by this.

Since the luminance signal of each specific picture element is obtained on the basis of an output obtained through the first color filters of picture elements located obliquely adjacent to the specific picture element, the embodiment is capable of adequately coping with a change of luminance obliquely taking place relative to the picture element.

Further, the manner in which the luminance signal Y is composed by the embodiment is not limited to the method shown in FIG. 3. It can be changed to any manner that gives the matrixes shown in FIGS. 2(b) and 2(c). For example, it is changeable as follows: A total of six signals are formed, including a signal which is obtained by delaying the signal W1 for the period of 1 H; a non-delayed signal W1; signals which are obtained by delaying these signals for a period of time corresponding to two picture elements respectively; a signal which is obtained by delaying the signal W2 for the period of time corresponding to two picture elements; and a non-delayed signal W2. Then, these signals are multiplied by the coefficients which are shown in FIGS. 2(b) and 2(c) respectively before they are added together. The coefficient values of the matrixes are not limited to those shown in FIGS. 2(b) and 2(c). In place of them, other suitable coefficient values may be used for multiplying the signals of the picture elements located in the positions corresponding to the filters W within the 3×3 matrix to obtain the luminance signal Y.

Further, the coefficient values of the matrixes are selected as follows: The total (1) of the coefficient values of the first column, the total (½) of the coefficient value of the second column, the total (¼) of the coefficient values of the third column, the total (¼) of the coefficient values of the first row, the total (½) of the second row and the total (¼) of the third row of FIG. 2(b) coincide with those of the corresponding coefficients of FIG. 2(c). By this, the occurrence of the spurious resolution can be minimized. The matrixes are not limited to the 3×3 matrixes and can be prepared to be 4×4 or 5×5 or larger matrixes as long as the sums of corresponding columns and those of corresponding rows of the two matrixes coincide with each other. Further, it goes without saying that the signals output from the output terminals 1-1 to 1-4 are stored in a digital field memory after they are temporarily A/D (analog-to-digital) converted; and the adding operations of FIGS. 2(b) and 2(c) are carried out when these signals are read out from the memory.

The embodiment described is arranged to form the luminance signal Y from the output signals W1 and W2. However, this arrangement may be changed as follows: A high-band luminance signal is formed by causing a high-frequency portion above 0.5 to 2 MHz or thereabout of the above stated luminance signal composition output which relates to the spurious resolution to pass through a high-pass filter. A low-band luminance signal is formed by causing a low-frequency portion of the luminance signal composition output which is lower than the high-band to pass through a low-pass filter. It is also possible to obtain the low-band luminance signal by forming a luminance signal forming matrix in accordance with the signals R, G and B shown in FIG. 1, i.e., Y=0.3 R+0.59 G+0.11 B before it is passed through the low-pass filter. After that, the high-band luminance signal and the low-band luminance signal are added together to obtain the luminance signal Y. Further, the delay lines which are arranged to delay inputs for periods of time corresponding to one picture element and to two picture elements as shown in FIG. 3 may be replaced with sample-and-hold circuits.

While the embodiment is arranged to obtain the luminance signal of each of the picture elements, it is possible to obtain a signal for a specific color component of each picture element by preparing the first filter for the specific color.

As described in the foregoing, the color image sensing system arranged according to this invention is capable of giving a color video signal with a less degree of spurious resolution by virtue of the solid-state image sensor which is provided with a combination of a plurality of color filters.

What is claimed is:

1. An image sensing system comprising:
   a) image sensing means having picture elements arranged in columns and rows;
   b) color separation filter means including first color filters which allow a luminance component to pass and are arranged for every other picture element both in the directions of columns and rows and at least second color filters which are arranged for remaining picture elements in a predetermined repetitive pattern; and
   c) luminance signal forming means for forming a luminance signal, said luminance signal forming means being arranged such that, in forming said luminance signal corresponding to a specific first one of picture elements which are provided with said first color filters, the luminance signal is formed by using at least signals of a plurality of picture elements located obliquely adjacent to said specific first picture element and a signal of said specific first picture element and, in forming said luminance signal corresponding to a specific second one of picture elements which are provided with said second color filters, the luminance signal is formed by using signals of a plurality of picture elements located adjacent to said specific second picture element in the vertical and horizontal directions.

2. A system according to claim 1, wherein said first color filters are colorless filters.

3. A system according to claim 1, wherein said second color filters include red filters.

4. A system according to claim 1, wherein said second color filters include blue filters.

5. A system according to claim 1, wherein said second color filters include red filters and blue filters.

6. A system according to claim 5, wherein said red filters and blue filters are arranged on every other row respectively.

7. A system according to claim 1, wherein said luminance signal forming means includes delay means.

8. A system according to claim 7, wherein said delay means includes a field memory.

9. A system according to claim 7, wherein said delay means includes a one-H memory.

10. An image sensing system comprising:
    a) image sensing means having picture elements arranged in columns and rows;
    b) color separation filter means including first color filters which allow a luminance component to pass and are arranged for every other picture element both in the directions of columns and rows and at least second color filters which are arranged for remaining picture elements in a predetermined repetitive pattern; and
    c) luminance signal forming means for forming a luminance signal, said luminance signal forming means being arranged such that in forming said luminance signal corresponding to a specific first one of picture elements which are provided with said first color filters, the luminance signal if formed by using at least signals of a plurality of picture elements located obliquely adjacent to said specific first picture element and a signal of said specific first picture element.

11. A system according to claim 10, wherein said first color filters are colorless filters.

12. A system according to claim 10, wherein said second color filters include red filters.

13. A system according to claim 10, wherein said second color filters include blue filters.

14. A system according to claim 10, wherein said second color filters include red filters and blue filters.

15. A system according to claim 14, wherein said red filters and blue filters are arranged on every other row respectively.

16. A system according to claim 10, wherein said luminance signal forming means includes delay means.

17. A system according to claim 16, wherein said delay means includes a field memory.

18. A system according to claim 16, wherein said delay means includes a one-H memory.

19. An image sensing system comprising:
a) image sensing means having picture elements arranged in columns and rows;
b) color separation filter means including first color filters which allow a luminance component to pass and are arranged for every other picture element both in the directions of columns and rows and at least second color filters which are arranged for remaining picture elements in a predetermined repetitive pattern; and
c) luminance signal forming means for forming a luminance signal, said luminance signal forming means being arranged such that, in forming said luminance signal corresponding to a specific second one of picture elements which are provided with said second color filters, the luminance signal is formed by using signals of a plurality of picture elements located adjacent to said specific second picture element in the vertical and horizontal directions.

20. A system according to claim 19, wherein said first color filters are colorless filters.

21. A system according to claim 19, wherein said second color filters include red filters.

22. A system according to claim 19, wherein said second color filters include blue filters.

23. A system according to claim 19, wherein said second color filters include red filters and blue filters.

24. A system according to claim 23, wherein said red filters and blue filters are arranged on every other row respectively.

25. A system according to claim 19, wherein said luminance signal forming means includes delay means.

26. A system according to claim 25, wherein said delay means includes a field memory.

27. A system according to claim 25, wherein said delay means includes a one-H memory.

28. A system according to claim 19, wherein said luminance signal forming means is arranged to form said luminance signal by using signals of picture elements disposed horizontally and/or vertically adjacent to each of said picture elements which are provided with said second color filters.

29. A color image sensing system comprising:
a) a solid-state image sensor which has every four mutually adjacent picture elements thereof grouped as one set and is provided with combinations of color filters including first color filters which are arranged to pass a given color component for an obliquely adjacent pair of picture elements within each of said sets and second and third color filters which are arranged to cover the remaining obliquely adjacent pair of picture elements of said set, said image sensor being arranged to have almost all picture elements thereof covered with said combinations of color filters; and
b) signal composing means arranged to receive an output of said solid-state image sensor and to form a signal corresponding to one of the picture elements for which said first color filters are provided by combining, in a predetermined ratio, an output of said one picture element and outputs of a plurality of picture elements which are provided with said first filters and are disposed obliquely adjacent to said one picture element, and to form a signal corresponding to one of the picture elements for which said second or third color filters are provided by combining, in a predetermined ratio, outputs of a plurality of picture elements which are provided with said first color filters and are disposed in the neighborhood of said one picture element above, below and on the right and left sides thereof.

30. A system according to claim 29, wherein said first color filters are colorless filters.

31. A system according to claim 29, wherein said second color filters include red filters.

32. A system according to claim 31, wherein said third color filters include blue filters.

33. A system according to claim 32, wherein said red filters and blue filters are arranged on every other row respectively.

34. A system according to claim 29, wherein said signal composing means includes delay means.

35. A system according to claim 34, wherein said delay means includes a field memory.

36. A system according to claim 34, wherein said delay means includes a one-H memory.

* * * * *